United States Patent

[11] 3,587,092

[72] Inventors Austin T. Kelly
Morristown;
John Nagy, Jr., Union, both of, N.J.

[21] Appl. No. 813,507
[22] Filed Apr. 4, 1969
[45] Patented June 22, 1971
[73] Assignee Weston Instruments, Inc.
Newark, N.J.

[54] ANALOG-DIGITAL CONVERTERS
21 Claims, 5 Drawing Figs.

[52] U.S. Cl. .................. 340/347AD, 340/347 NT
[51] Int. Cl. .................. H03k 13/02, H03k 13/10
[50] Field of Search .................. 340/347

[56] References Cited

UNITED STATES PATENTS

| | | | |
|---|---|---|---|
| 3,458,809 | 7/1969 | Dorey | 340/347 |
| 3,439,272 | 4/1969 | Bailey | 340/347 |
| 3,439,271 | 4/1969 | Metcalf | 340/347 |

*Primary Examiner*—Maynard R. Wilbur
*Assistant Examiner*—Jeremiah Glassman
*Attorneys*—William R. Sherman, Stewart F. Moore and Jerry M. Presson

ABSTRACT: Apparatus is disclosed for converting a relatively slow time-varying or analog input signal into a time interval, pulse width and/or a digitally displayed form which respectively represent the magnitude of the input signal. The apparatus is designed to perform the conversion function with a minimum number of circuit components and finds special application in small-sized, low-cost digital voltmeters.

INVENTORS
Austin T. Kelly
John Nagy, Jr.
BY
J. M. Presson
ATTORNEY

ANALOG-DIGITAL CONVERTERS

This invention relates to apparatus for converting an analog signal magnitude into a representative, measurable time interval and more particularly, into a representative digital output and has special application to low-cost digital voltmeters.

In the art of analog-digital converters and more particularly, digital voltmeters, emphasis has been placed on providing low-cost, small-sized instruments, possessing good reliability. These objectives are generally most easily attainable if the conversion function can be performed with a minimum number of components.

According to the instant invention, apparatus is provided which requires a minimum of circuitry to convert an analog signal magnitude into a representative, measurable time interval and more particularly, into a representative, digital output which may be decoded and displayed.

A reduction in the number of circuit components is made possible in accordance with the instant invention by operating an operational amplifier having parallel capacitive and resistive negative feedback circuits in two modes. In one mode, the amplifier is operated as a sensitive and stable DC amplifier having a high input and a low output impedance, with the resistive negative feedback network coupling the amplifier output to the amplifier input. In this mode, the amplifier output charges a capacitor, which similarly couples the amplifier output to the amplifier input, to a potential proportional to the magnitude of the analog signal. In the second mode of operation, the resistive feedback network is broken, such that the amplifier and the capacitor form an integrating circuit. A reference signal of known magnitude and of polarity opposite that of the analog input signal is applied to the thusly formed integrating circuit to discharge the capacitor. The capacitor is discharged by the reference signal at a known, essentially constant rate to generate an output potential which ramps toward a predetermined voltage reference level, typically 0 volts. The ramp has a slope which is essentially constant and the time required for the ramp to reach this predetermined level is clocked by a counter to provide a digital representation of the analog signal magnitude. The reference signal may be applied coincidentally with the analog input signal to the amplifier input when the amplifier is operated in the second mode in which case it is possible through operation of a single switching device to selectively apply the reference signal to the amplifier input and to simultaneously form an integrating circuit capable of generating the output ramp. As an alternative, the input signal may be disconnected from the amplifier input during the second mode. Embodiments for achieving either effect are disclosed.

In furtherance of the above objectives, the minimum time interval during which the capacitor is charged is determined by a one-shot multivibrator having a predetermined time constant. The one-shot, in addition to establishing the minimum time interval for charging the capacitor, is also used to hold the ramp-clocking counter against advancing and at a count equivalent to the magnitude of the analog signal under measurement for a long enough time for the counter to stabilize and provide a readable display of this magnitude.

For a better understanding of the present invention, together with other and further objects thereof, reference may be had to the following description taken in connection with the accompanying drawings, the scope of the invention being pointed out in the appended claims.

Referring to the drawings.

Figure 1:
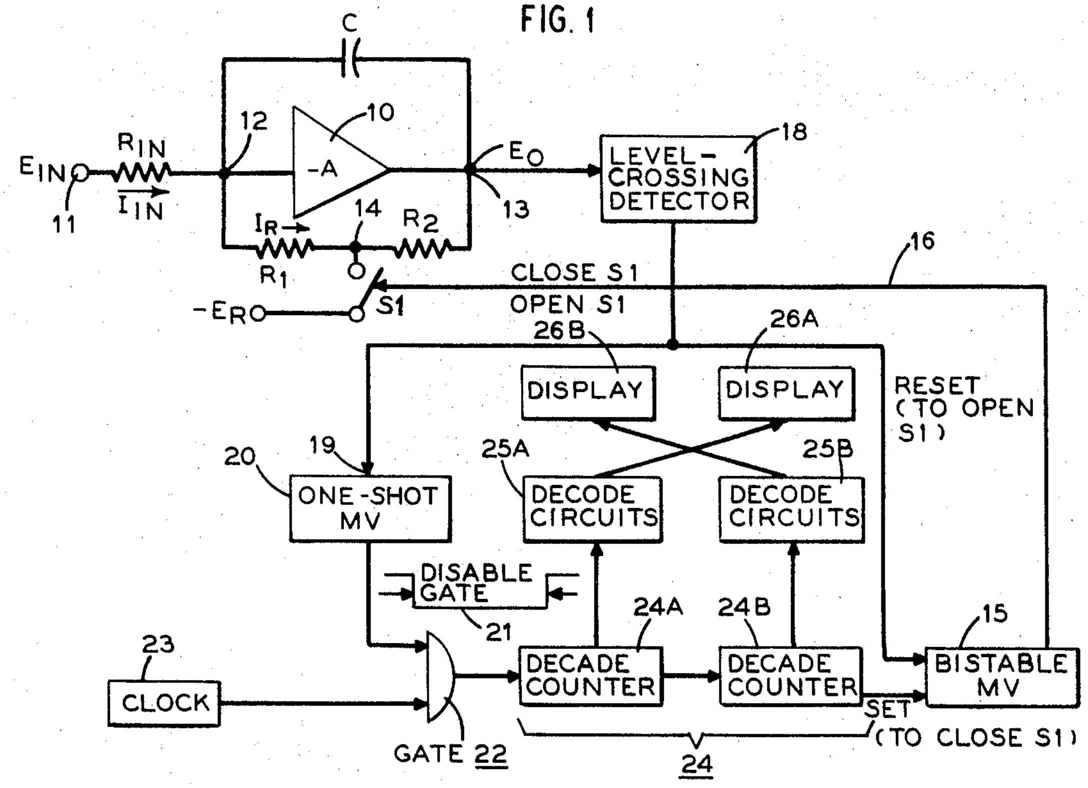
FIG. 1 is a schematic and block diagram of one embodiment of an analog-digital converter, constructed in accordance with this invention.
Figure 2:
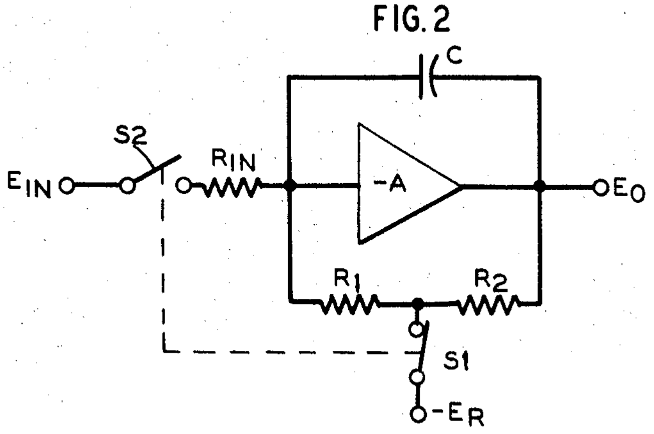
FIG. 2 is a schematic diagram of another embodiment of instant converter illustrating switch means for selectively applying the analog input signal to the converter input.
Figure 3:
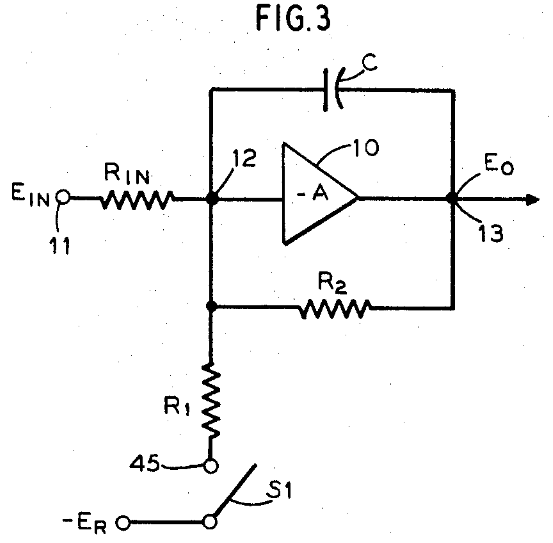
FIGS. 3 and 4 are schematic diagrams of two other embodiments of the instant invention which may be used to advantage to reduce the magnitudes of errors engendered by nonlinearities in the conversion process.
Figure 4:
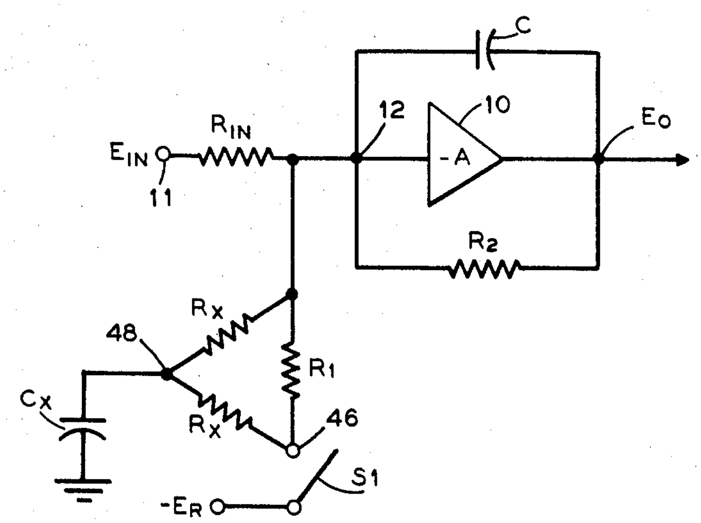

Various portions of the circuit arrangements shown in FIGS. 2, 3 and 4 corresponding to the various elements of FIG. 1 are identified with the same reference characters as used in FIG. 1.

The instant converter, shown partially in schematic and partially in block form in FIG. 1, includes a conventional, single-ended input operational amplifier 10 which characteristically has a high input, a low output impedance and a high negative voltage gain, designated $-A$. Voltage gains on the order of 50,000 and greater are typically obtainable with this type of amplifier. An analog signal of unknown magnitude is applied to the signal-inverting terminal of the amplifier and a reference signal of greater magnitude and opposite polarity to the analog signal is applied to that same terminal.

The analog input signal, either a current or a voltage, is typically a DC or a relatively slow time-varying signal. The instant invention finds particular application to digital voltmeters wherein the analog signal is a voltage $E_{IN}$ having a magnitude which is to be displayed in digital form by, for example, firing or strobing a digital display.

Referring again to FIG. 1, the analog voltage $E_{IN}$ is received at a converter input terminal 11 and converted into an analog input current $I_{IN}$ by an input resistor $R_{IN}$ connected between the terminal 11 and a current summing junction 12. The value of the analog current $I_{IN}$ is equal to $E_{IN}/R_{IN}$ and the junction 12 is connected to the signal-inverting terminal of the amplifier 10.

Amplifier output terminal 13, at which amplifier output voltage $E_o$ appears, is coupled to the junction 12 by first and second parallel, negative feedback circuits which individually supply a high amount of feedback to the amplifier input and thus maintain a virtual ground potential at the junction 12. The first feedback circuit is principally resistive in nature and comprises series-connected resistors $R_1$ and $R_2$ and the second feedback circuit is principally capacitive in nature and comprises an integrating capacitor C. The resistors $R_1$ and $R_2$ have a tapped junction 14 to which a reference voltage of $E_R$ of opposite polarity to the input voltage $E_{IN}$ is selectively applied by closure of a switching device S1 coupled between the source $E_R$ and the junction 14. The corresponding reference current $I_R = ER/R_1$, of sufficient magnitude to discharge the capacitor C to a predetermined level, typically 0 volts, within a prescribed time interval, designated $T_x$ in FIG. 3, is applied to the junction 14 when the device S1 is closed. The reference voltage $E_R$ is preferably a DC voltage having a magnitude precisely regulated by techniques known to those working in the art. The direction of reference current flow relative to the junction 14 is determined by the polarity of the reference voltage. Flow is from the junction 14 toward the reference source, as indicated by the arrow, when the reference voltage is negative with respect to ground potential. Since the capacitor C typically charges for a longer time than that provided for discharging the capacitor to some predetermined potential level and because the current derived from the reference voltage is utilized to discharge the capacitor, the magnitude of the current $I_R$ is typically several times that of the desired full scale value of the analog input current $I_{IN}$. For positive values of $E_{IN}$ the polarity of the reference voltage $ER$ is negative, and vice versa.

The switch S1 may be, as depicted, a simple single-pole single-throw switch, having the state thereof controlled by, for example, an armature (not shown) which is bidirectionally displaceable by selectively energizing a surrounding coil. More typically, however, the switch S1 comprises a solid state switching device, such as a transistor, which may be driven selectively from a nonconductive (or essentially open-circuit state) to a saturated (or essentially closed-circuit state) upon the application of a suitable switching signal to a device control terminal. The control terminal may comprise the gate terminal of a field-effect transistor or the base junction of an NPN- or PNP-type transistor for positive and negative reference voltages, respectively. The switching signals are typically sharp or step voltage transitions from one DC level to another of sufficient magnitude to drive the transistor into a nonconductive or into a saturated state, depending upon the direction of the voltage transition.

Figure 5:
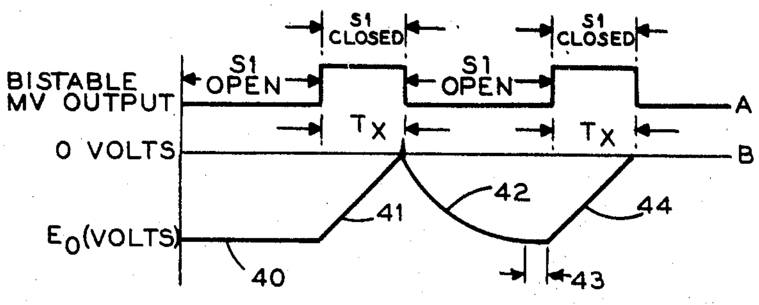
FIG. 5A depicts a typical relationship between the output of a bistable multivibrator employed in the instant invention and the state of a switching device controlled by the bistable to selectively apply a reference current to the input of an integrating amplifier.
FIG. 5B illustrates a typical waveform at the output of the integrating amplifier and in conjunction with FIG. 5A illustrates the relationship between the amplifier output potential and the application of reference signal to the amplifier input.

A bistable multivibrator or flip-flop 15 produces respective positive- and negative-going step voltage transitions of sufficient magnitude to change the state of the switch S1 when the bistable is triggered to change state. The step voltage transitions are transmitted by a conductor 16 to the switch S1. The bistable 15 has two input leads, designated SET and RESET, corresponding respectively to its two possible stable states. In response to a suitable triggering signal received from the detector 18 via the RESET lead the bistable 15 changes from the SET to the RESET state whereupon the output of the bistable goes sharply to a level (for example, to a more negative level, FIG. 5A) which will open the switch S1. When the bistable is driven back to the SET state by a triggering signal applied to the SET lead, the output of the bistable goes sharply in an opposite direction to a level (for example, to a more positive level, FIG. 5A) which will close the switch S1.

For reasons which will be apparent subsequently, the length of time during which the bistable 15 remains in the SET state, and hence the width of the bistable 15 output signal produced during the corresponding interval of time, is directly proportional to the magnitude of the analog input signal.

The detector 18 may comprise a conventional comparator-amplifier circuit having some predetermined threshold detection level. Inasmuch as a 0-volt detection level is readily obtainable with such circuits by merely connecting one comparator input to ground potential, and additionally to facilitate an understanding of this invention, the detection level of the detector 18 will hereinafter be assumed to be 0 volts. It will be apparent, however, that the detector 18 could be selected or designed to detect the crossing by the voltage $E_o$ of some predetermined voltage level other than 0 volts. The other input of the comparator circuit is coupled to terminal 13 so that a magnitude comparison may be made between the instantaneous output voltage $E_o$ and 0 volts.

Regardless of the exact type of detector utilized, it should be capable of producing an output signal of sufficient magnitude and of proper polarity to coincidentally trigger the multivibrator 15 into its RESET state when the voltage $E_o$ exceeds the established detection level. A slight voltage overshoot of the detection level by the generated ramp normally occurs because of the inability of the system to respond instantaneously to zero-crossing by the generated ramp. The slight overshoot is depicted in FIG. 5A as joining the ramp 41 and the waveform 42 and normally has a spike waveform, which after amplification, and if necessary, inversion, may be used to advantage as the multivibrator trigger signal.

The trigger signal from detector 18, in addition to triggering the bistable 15 into its RESET state, is coincidentally applied to an input 19 of a one-shot or monostable multivibrator 20, to practically simultaneously trigger the one-shot into an unstable state. Alternatively, the RESET output of the bistable 15 may be fed via the conductor 16 to the input 19 after being differentiated by means of a conventional differentiator circuit. The differentiated RESET output is a spike waveform which may be used in lieu of the trigger signal from the detector 18 to drive the one-shot into its unstable state. The time constant of the one-shot 20 determines the time delay between the automatic return of the one-shot to its previous or stable state from a second or unstable state to which the one-shot is triggered. The output signals obtained from the one-shot 20 when the one-shot switches into the unstable state and when it switches back into the stable state are respective, coincidental first and second oppositely directed sharp voltage transitions having a time of separation equal to the time delay of return of the one-shot to its stable state. Numeral 21 designates an exemplary voltage waveform produced by the one-shot. The width of the more negative pulse portion 21 of this waveform is determined by the time delay of the one-shot, or correspondingly, the time interval during which the one-shot remains in its unstable state. This time delay should be at least long enough to permit the capacitor C to charge to a potential which is proportional to the magnitude of the voltage $E_{IN}$. Thus, the time constant of the one-shot 20 is at least greater than that of the capacitor C charging circuit, as determined by the values of the resistor $R_{IN}$ and the capacitor C.

The pulse 21 controls the state of a coincidence gate 22 and thus the flow of clock pulses from a clock 23 to counting stages of pulse counting means 24. More specifically, the gate 22 is disabled and blocks clock pulse flow to the counting means when the leading edge of pulse 21 is received by the gate. Conversely, the gate 22 is enabled by the trailing edge of pulse 21 to pass clock pulses to the counting means and remains enabled until it is again disabled by the leading edge of the next-received pulse 21. Since it has been assumed that the gate-disabling leading edge of the pulse 21 is negative-going, the gate 22 may be an AND gate. Conversely, if the leading edge of the pulse 21 is positive-going, an inverting AND (or NAND) gate would be suitable. Since the leading edge of pulse 21 is produced practically coincidentally with the multivibrator trigger signal from the detector 18 and since the leading edge of this latter signal is produced coincidentally by the zero-crossing of the ramp portion of $E_o$, the gate 22 is disabled each time and at substantially the same instant that $E_o$ crosses 0-volts. Moreover, since the gate 22 is enabled a predetermined time thereafter by the trailing edge of pulse 21, the gate remains disabled for a time interval equal to the time delay of the one-shot 20.

While the gate 22 is disabled, clock pulses are prevented from flowing into pulse counting means 24 which allows the counting means to stabilize. The time delay of the one-shot 20 may be increased, if necessary, to extend the capacitor C charging time beyond that time which is required to charge the capacitor to a steady state condition, the additional time being utilized to ensure an easily recognizable persistent display of the analog input signal magnitude. By holding the counting means 24 from advancing and at a count which corresponds to the magnitude of the analog signal, the signal in equivalent digital form may be displayed with recognizable persistence, thereby obviating the need for buffer storage circuits. One can usually recognize within a time period of, for example, 0.2 second the numerical value of a persistently displayed number having a resolution of three or four digits. Thus, the interval during which the one-shot 20 remains in an unstable state to disable the gate 22 and prevent the counting means 24 from advancing and reinitiating another conversion cycle may be equal to the minimum desired display period of 0.2 second.

The counting means 24 comprises a plurality of binary-coded decimal counters or stages connected in tandem. The counters may be decade counters. The number of counters employed is usually governed by the resolution desired in the measurement and for the purpose of simplifying as much as possible the instant description, the converter is depicted as including only two decade counters or stages 24A and 24B. Clock pulses are first counted by the counter 24A which is coupled directly to the gate 22 and provides the least significant or unit's binary-coded decimal output. When the counter 24A is filled to capacity, it produces a full scale or overflow output signal to the most significant, and in this case the ten's decade counter 24B, to advance this latter counter once. The number of times the ten's counter is advanced therefore depends upon the number of times the unit's counter recycles during a conversion cycle.

The binary-coded decimal (BCD) voltage outputs of the counters 24A and 24B may be translated into voltages which represent an equivalent decimal number by operation of conventional BCD-to-decimal decode circuits 25A, 25B. The voltage outputs of the decode circuits may be utilized to drive display apparatus 26A, 26B to display the decoded counter outputs in the desired representative form.

The display apparatus may take various forms, such as digit wheel printout devices, cathode-ray tubes, electroluminescent devices or photoconductive devices, to mention but a few. In digital voltmeters, the display often takes the form of conventional gas display tubes and hence this type of display will be described briefly. One tube is associated with one counter or stage and each tube employs 10 cold cathodes shaped to form the 10 decimal numbers 0, 1...9, respectively. An anode common to all cathodes in one tube receives an excitation potential from a DC voltage source of suitable magnitude. A cathode in each tube is selected to receive a firing signal, which may be ground potential, from a corresponding decode circuit, the cathode selected representing the decimal number which is at that instant in the corresponding counter in binary-coded decimal form.

To illustrate, assuming both counters 24A and 24B are decade counters filled to count capacity, the pulse count in the counters in binary-coded decimal form is instantly decoded by the circuits 25A, 25B, respectively, and displayed by the tubes 26A, 26B, respectively as decimal number 99. The next clock pulse received by the counter 24A will cause all stages in both counters to reset or clear and generate an overflow or carry signal from the highest order counter 24B. This overflow signal is taken off by the SET lead to trigger the bistable 15 into its SET state, whereupon the switch S1 is closed. All outputs from the counters 24A and 24B are then zero value outputs corresponding to displayed decimal numbers 00 and in the time domain, FIG. 5B, to the instants of generation ($T_x$=0) of the ramp portions 41 and 44 of the voltage $E_o$. The time $T_x$ required for a corresponding ramp portion 41 or 44 to cross 0-volts is counted by the counting means until level crossing by $E_o$ is detected by the detector 18.

It will be apparent that the rate which the counters 24A and 24B count is determined by the frequency of the clock pulses received from the clock 23. With a clock 23 operating a relatively high frequency of, for instance, 0.5 MHz. the counters 24A and 25B are driven so fast that while the one-shot 20 is in its stable state the numbers presented by the display 26A, 26B appear to the human eye as numbers which flicker so rapidly as to be unrecognizable. However, when the counters are permitted to stabilize, output firing voltages are applied to the selected cathodes of the display tubes which persist long enough for the displayed numbers to be determined visually. Copending U.S. application Ser. No. 813,506 of I. Munt, entitled "Apparatus for Eliminating Flicker in a Driven Display" filed Apr. 4, 1969, discloses apparatus suitable for use with any embodiment of the instant invention to eliminate display flicker during the ramping intervals without resorting to expensive storage circuits.

As discussed above, the full scale recycling of the counters 24A and 24B determine, by way of triggering the bistable 15 into the SET state, the instant of closing the switch S1 and the application of the reference voltage $E_R$ to the junction 14 to initiate the generation of the ramp $E_0$. Since the counters reinitiate counting when the gate 22 is enabled by the termination of the time delay of the one-shot 20, the time increment between the disabling of the gate 22 and the application of a SET triggering pulse to the bistable 15 depends upon the frequency of the clock 23, the number of stages connected in tandem to form the counting means 24 and the count which was accumulated by the counters at the instant the gate 22 is enabled. This time increment, designated 43 in FIG. 5B, is of course additional to the time delay provided by the one-shot 20. However, because the counting means 24 fills to capacity at such a high rate of speed, the additional time increment is normally negligible compared to the time delay provided by the one-shot 20. This additional time increment serves to delay slightly the application of a SET trigger pulse and correspondingly the length of time the switch S1 is held open by the bistable 15 and therefore, merely increases slightly the length of time that the capacitor C remains in a steady-state charged condition.

With the switch S1 open, the converter operates as a DC amplifier having a steady state or DC gain, $-A$, proportional to the output voltage $E_o$ divided by the input voltage $E_{IN}$. Expressed in terms of circuit parameters in such case the instant converter will operate as a DC amplifier with a gain $$-A=\frac{-E_0}{E_{IM}}=\frac{(R_1+R_2)}{R_{IN}} \qquad (1)$$

Under steady-state conditions, the capacitor $C$ is charged to a steady-state voltage equal to $E_o$ since the junction 12 is maintained at virtual ground and the relationship between the output voltage $E_o$ and the input voltage $E_{IN}$ is thus, $$E_0=\frac{-E_{IN}(R_1+R_2)}{R_{IN}}=-I_{IN}(R_1+R_2) \qquad (2)$$

This steady-state condition is depicted in FIG. 5B as a straight line 40 extending essentially parallel to the reference voltage level of 0 volts and displaced a distance $-I_{IN}(R_1+R_2)$ therefrom.

When the switch S1 is closed by a SET trigger signal applied to the bistable 15, the resistor $R_2$ appears merely as an impedance tied to the amplifier output and isolated from the amplifier input. This is because the switch S1 is assumed to have a low impedance and inasmuch as the source $E_R$ is of practically constant potential, any reasonable amount of current flow in the resistor $R_2$ will be shunted into the source $E_R$ and will not flow to the junction 12. Manifestly, the resistive feedback loop is now also open which permits the amplifier 10 and the capacitor $C$ to operate as an integrating circuit and more specifically, as a ramp generator. The ramp portion 41, FIG. 5B, of the waveform $E_o$ is initiated coincidentally with closure of the switch S1, FIG. 5A, because a reference current $I_R=E_R/R_1$ of opposite direction and of greater magnitude than the input current $I_{IN}$ now flows through the resistor $R_1$ from the junction 12 causing a linear reduction in the charge on the capacitor C.

In the embodiment illustrated by FIG. 1, the analog input signal and the reference signal are disclosed as being applied simultaneously to the junction 12. In such case, the time integral $T_x$, FIG. 5B, required to discharge the capacitor to 0 volts is $$T_x=\frac{-E_0(t)C}{(I_R-I_{IN})} \qquad (3)$$

Since the initial value of $E_o(t)$ is set forth above by equation (2), substituting this value for $E_o(t)$ in equation (3) yields, $$T_x=\frac{I_{IN}[C(R_1+R_2)]}{(I_R-I_{IN})} \qquad (4)$$

By making the magnitude of $I_R>>_{IN}$ $$T_x\doteq\frac{I_{IN}[C(R_1+R_2)]}{I_R} \qquad (5)$$

Assuming the parameters of interest of $C$, $R_1$, $R_2$ and $I_R$ are of constant value, the value of $T_x$ is directly proportional to the magnitude of the analog input signal because equation (5) above may then be reduced to, $$T_x\doteq K_1I_{IN}\doteq K_2E_{IN} \qquad (6)$$

where the constant $K_2=R_{IN}K_1$.

It will be apparent that by counting with precisely spaced clock pulses the total time interval, $T_x$, for a ramp of known, constant slope to attain a predetermined potential level from a potential level proportional to the analog signal magnitude, the number of clock pulses counted during the interval $T_x$ will provide a digital representation of the analog signal magnitude which may be displayed as an equivalent decimal number.

The threshold detection level of the detector 17 may be subject to slight variations due to, for example, changes in ambient temperature. Errors attributable to such changes may be decreased by ramping the voltage $E_o$ from an initial level which is appreciably off the threshold detection level. Thus the level of the curve 40, FIG. 5B, ramps from a level which is substantially off the assumed 0-volt threshold level. To obtain this result, the resistor $R_2$ may be made larger than the resistor $R_1$ inasmuch as it is the ratio of $R_2$ to $R_1$ which determines the gain of the converter in the DC amplifying mode and hence the relationship as set forth by equation (2) above. The ratio of $R_1$ to $R_{IN}$ with the switch S1 open determines the ratio of $E_{IN}$ to $E_R$ (or $I_{IN}$ IN $I_R$) and, as will be apparent from equation (4) above, the length of the interval $T_x$ is determined by the ratio of $E_R$ to $E_{IN}$. The interval $T_x$ should be long enough to provide an accurate measurement of the analog signal magnitude consonant with the maximum permissible time of each conversion cycle as determined principally by the frequency of the clock 23 and the factor by which the clock frequency is divided by the counting means 24. Since the resolution of the number displayed is determined by the number of counters comprising the counting means 24, the desired resolution of measurement often determines the minimum clock frequency.

If the instant converter is operated continuously one or more times in succession, it may not have time to stabilize sufficiently to produce a steady-state output voltage $E_0$ immediately prior to the generation of the measured ramp. Other factors, such as the gain of the amplifier 10 and the values of the capacitor $C$ and the resistor $R_{IN}$ will enter into the equations which determine the relationship between $E_0(t)$ and $E_{IN}$ during charging of the capacitor $C$. During nonsteady state charging of capacitor $C$ this relationship between $E_0(t)$ and $E_{IN}$ is depicted by the nonlinear portion 42 of the $E_0$ waveform in FIG. 5B. The equation characterizing the portion 42 is, $E_0(t)=-I_{IN}(R_1+R_2)\,[1-exp\,(-t/ACR_{IN})]$. (7)

The exponential quantity of equation (7) namely, $(-t/ACR_{IN})$, defines the characteristic time response of c capacitor $C$ in being charged by the analog input current $I_{IN}$. The desired proportionality between $E_0$ and $I_{IN}$ as expressed by equation (1) above, at the instant the ramp voltage $E_0$ is initiated, is obtained by allowing the capacitor $C$ time to charge to a steady-state potential proportional to the magnitude of the applied signal for at least a relatively short time increment designated 43 in FIG. 5B before the switch S1 is closed. Consequently, when the switch S1 is closed, FIG. 5A, the output voltage $E_0$ is constant and equal to $-I_{IN}(R_1+R_2)$. The increment 43 is correspondingly depicted as a straight line which is parallel to the line 40 and displaced an equal, constant voltage from the assumed 0-volt reference axis. As discussed above, the capacitor $C$ is permitted to attain this steady-state condition by providing a sufficient time delay to the return of the one-shot 20 to its stable state.

Numeral 44, FIG. 5B, designates the second essentially linear ramp which is created when the switch S1 is closed and the capacitor $C$ discharged by withdrawing reference current $I_R$ from the junction 12. Since the ramp 44 is initiated from a level which is also proportional to the magnitude of the analog input signal the second time integral $T_x$ corresponding to the length of time required for the ramp 44 to cross 0-volts represents the magnitude of the analog signal.

With the input voltages $E_{IN}$ applied continuously to the junction 12 for an entire conversion cycle, the quantity $(I_R-I_{IN})$ in equation (4) above, reflects the algebraic summing of the reference and input currents at the junction 12 during the interval $T_x$. With reference current $I_R$ assumed to be of much greater magnitude than $I_{IN}$, equation (5) above, indicates that the relationship between $T_x$ and $I_{IN}$ (or $E_{IN}$) is practically linear. The following is an analysis of the magnitude of errors which are attributable to nonlinearities in this relationship and derive from the assumption in equation (5) above, that the presence of $I_{IN}$ during the interval $T_x$ may be disregarded if $I_R>>I_{IN}$, that is, if $$\frac{I_{IN}}{I_R}\ll 1$$

Since $I_R=KI_{fs}$; (8)

where $K$ is a constant greater than unity and $I_{fs}$ is the full scale current, and $I_{IN}=XI_{fs}$; (9)

where $X$ is a constant of proportionality less than, or equal to, unity relating the input current to the full scale current; substituting equations (8) and (9) into equation (4) above, and solving for $T_x$ yields:

$$T_x=\frac{X[C(R_1+R_2)]}{(K-X)} \qquad (10)$$

For $I_{IN}=I_{fs}$ Equation 10 reduces to:

$$T_{fs}=\frac{C(R_1+R_2)}{K-1} \qquad (11)$$

where $T_{fs}$ is the full scale value of the time integral $T_x$.

The nonlinearity of a generated ramp and hence of the instant converter may be expressed as a fractional error at full scale input.

$$\text{Fractional error}=\frac{T_x-XT_{fs}}{T_{fs}} \qquad (12)$$

After substituting equations (10) and (11) into equation (12);

$$\text{Fractional error}=\frac{X(X-1)}{K-X}, \qquad (13)$$

and $$\text{Percent error}=\frac{100(X)(X-1)}{K-X} \qquad (14)$$

Solely by way of example, the following is a tabulation of converter nonlinearities of the aforedescribed embodiment of the instant converter for various ratios of $I_{IN}$:$I_{fs}$ and specifically for an exemplary value of $K$=50. $K$=50 when, for example, $I_{fs}$=10 $\mu$a. and $I_R$=500 $\mu$a.

| $\frac{I_{IN}}{I_{fs}}=X$ | Percent error $(fs)=100\frac{(X)(X-1)}{50-X}$ |
|---|---|
| 0 | 0 |
| .1 | 0. 180 |
| .2 | 0. 321 |
| .3 | 0. 422 |
| .4 | 0. 484 |
| .5 | 0. 505 |
| .6 | 0. 486 |
| .7 | 0. 426 |
| .8 | 0. 325 |
| .9 | 0. 183 |
| 1.0 | 0 |

If the percent error or nonlinearity is plotted against values of $X$, the resulting curve closely approximates a square-law or parabolic function or curve.

ADDITIONAL EMBODIMENTS OF INVENTION

In order to reduce the nonlinearity of conversion which results from having the input signal applied continuously to the junction 12 during each conversion cycle, and more particularly during those time intervals when the reference current is applied to the junction 12, a switching device may be utilized to decouple the analog signal source from the junction 12 while the reference signal is being applied to that junction.

The embodiment of FIG. 2 discloses an input switching arrangement for selectively applying the analog input signal to the junction 12, the arrangement including an input switch S2 which may be identical to the switch S1 but operated 180° out-of-phase with the latter switch through various expedients which will be obvious to those working in the art. With the switch S1 open, the switch S2 is closed to apply the input signal to the junction 12. Conversely, with the switch S1 closed, the switch S2 is opened to disconnect the analog input signal from the junction 12 so that the capacitor $C$ is discharged only by the reference current $I_R$.

While the embodiment of FIG. 2 has the advantage of reducing the nonlinearity of the conversion it suffers the disadvantage of requiring an additional switching device S2 and possibly an additional input amplifier connected in front of the operational amplifier 10 for input signal amplification, which makes this embodiment of the instant converter slightly more complex and expensive to implement than the embodiment of FIG. 1.

It is possible to improve the accuracy of conversion over that obtainable with the embodiment of FIG. 1 without utilizing an input switching device by having the front end of the converter in the form shown by FIG. 3. In this embodiment the feedback resistor $R_2$ is connected in parallel with the capacitor $C$ but the two ends of the resistor $R_2$ are respectively connected directly to the current summing junction 12 and to the output terminal 13. The resistor $R_1$, instead of being connected in series with the resistor $R_2$, has one end connected directly to the junction 12 so that this end of resistor $R_2$ is commonly connected to the junction 12 and to the amplifier-input end of the resistor $R_2$. The other end of resistor $R_1$ is connected to a terminal 45 to which the reference voltage $-E_R$ is applied by selectively closing the switch S1 in the manner disclosed above.

Although employing the same number of components as the embodiment of FIG. 1, the embodiment of FIG. 3 reduces the percent error nonlinearity in conversion over that obtainable with the FIG. 1 embodiment by a factor of about 50 percent so that a digital voltmeter constructed in accordance with the FIG. 3 embodiment is good to about one-quarter percent accuracy. The following equations are offered to show why this is the case.

With the switch S1 open, $$E_0=\frac{-R_2}{R_{IN}}E_{IN} \qquad (15)$$

With the switch S1 closed, $$E_0(t)=\frac{-R_2}{R_{IN}}E_{IN}+\frac{E_R}{R_1C}-\frac{E_{IN}}{R_{IN}C}-\int_{t=0}^{t=t}\frac{E_0(t)}{R_2C}dt \qquad (16)$$

The time $T_x$ required for zero-crossing by $E_0(t)$ may be determined by setting $E_0(t)=0$ and equation (16) reduces to:

$$0=-\frac{R_2}{R_{IN}}E_{IN}+\frac{E_R}{R_1C}T_x-\frac{E_{IN}}{R_{IN}C}T_x-\frac{E_0}{2R_2C}T_x \qquad (17)$$

Substituting for $E_0$ in Equation 17 the dependent part of equation 15, $$0=-\frac{R_2}{R_{IN}}E_{IN}+\frac{E_R}{R_1C}T_x-\frac{E_{IN}}{R_{IN}C}T_x+\frac{R_2E_{IN}}{2R_2CR_{IN}}T_x \qquad (18)$$

Solving for $T_x$, $$T_x=\frac{R_2C\left[\frac{E_{IN}}{R_{IN}}\frac{R_1}{E_R}\right]}{1-\frac{1}{2}\left[\frac{E_{IN}}{R_{IN}}\frac{R_1}{E_R}\right]}=\frac{R_2C\frac{I_{IN}}{I_R}}{1-\frac{1}{2}\frac{I_{IN}}{I_R}} \qquad (19)$$

Assuming $$\frac{I_{IN}}{I_R}\ll 1$$

$$T_x\doteq R_2C\frac{I_{IN}}{I_R}\left[1-\frac{I_{IN}}{2I_R}\right] \qquad (20)$$

And since $I_R=KI_{fs}$, $$T_x\doteq\frac{R_2C}{K}\frac{I_{IN}}{I_{fs}}\left[1-\frac{I_{IN}}{2KI_{fs}}\right] \qquad (21)$$

The full scale current $I_{IN}=I_{fs}$, and correspondingly, the full scale time interval $T_x=T_{fs}$. Thus, from equation (21), $$T_{fs}\doteq\frac{R_2C}{K}\left[1-\frac{1}{2K}\right] \qquad (22)$$

Solving for the fractional error by substituting for the parameters $T_x$ and $T_{fs}$ in equation (12) the dependent parts of equations (21) and (22), respectively, Fractional error $\doteq$ $$\frac{\frac{R_2C}{K}\frac{I_{IN}}{I_{fs}}\left[1-\frac{I_{IN}}{2KI_{fs}}\right]-\frac{XR_2C}{K}\left[1-\frac{1}{2K}\right]}{\frac{R_2C}{K}\left[1-\frac{1}{2K}\right]}=\frac{\frac{I_{IN}}{I_{fs}}\left[1+\frac{I_{IN}}{2KI_{fs}}\right]-X\left[1+\frac{1}{2K}\right]}{1+\frac{1}{2K}} \qquad (23)$$

Since $I_{IN}=XI_{fs}$ from Equation (9), $$\text{Fractional error}=\frac{X\left[1+\frac{X}{2K}\right]-X\left[1+\frac{1}{2K}\right]}{1+\frac{1}{2K}}=\frac{X(X-1)}{2K+1} \qquad (24)$$

and $$\text{Percent error}=100\frac{(X)(X-1)}{2K+1} \qquad (25)$$

Equation (25) may be compared with equation (14) above. For values of $X$ between 0 and 1.0 and for the same assumed value of $K$ ($K$=50), a tabulation of $X$ versus percent error like that performed with equation (14) indicates that equation (25) also closely follows a parabolic curve but that the maximum percent error is approximately one-half that obtained with equation (14), or on the order of 0.25 percent. Thus, assuming all other operative factors equal, the embodiment of FIG. 3, although having the same number of components as the corresponding front end portion of the embodiment of FIG. 1, permits the instant converter to provide a more accurate conversion.

Through the use of additional components the linearity of the instant converter may be further improved.

FIG. 4 illustrates another embodiment of the instant invention which further increases linearity. In this embodiment the resistor $R_1$ forms a delta circuit network with two resistors $R_x$ of equal resistance value. The circuit network may also be an equivalent pi network. One of the resistors $R_x$ and the resistor $R_1$ are joined at a terminal 46 to which the reference voltage $-E_R$ is applied by closure of the switch S1. The two resistors $R_x$ are commonly joined at a terminal 48 connected to one plate of a capacitor $C_x$. The other plate of the capacitor $C_x$ is connected to ground potential.

Following an analysis similar to that made in regard to the circuit arrangement of FIG. 3, it can be shown that if the condition, $$CR_1R_2=C_xR_{x2}\text{ is met, then} \qquad (26)$$

$$T_x\doteq\frac{R_1R_2CE_{IN}}{R_{IN}E_R}\doteq R_2C\frac{I_{IN}}{I_R} \qquad (27)$$

and $$L_{fs}\doteq\frac{R_2C}{K} \qquad (28)$$

Accordingly, the fractional error is approximately zero, which as a practical matter, means that the nonlinearity in the converter is relatively insignificant and, if present, may be attributed to higher order error terms.

SUMMARY OF OPERATION

The overall operation of the various aforedescribed embodiments is summarized briefly as follows. Assuming that the ramp portion 41 of the waveform $E_0$ has just crossed 0 volts, the detector 18 senses this crossing and in response thereto produces an output signal which triggers the one-shot 20 into its unstable state and simultaneously resets the bistable 15. When the one-shot 20 switches into its unstable state a sharp voltage transition is produced at the one-shot output which disables the gate 22, whereupon the gate acts to block the flow of pulses from the clock 23 to the counting means 24. The counting means 24 stabilizes and drives the display 26A, 26B to display the decimal value of the input signal under measurement. When RESET, the bistable 15 produces a sharp output voltage transition which opens the switch S1 and allows the capacitor C to charge to a potential proportional to the analog signal magnitude, this potential level being, for example, the steady-state level 40 in FIG. 5, if there has been no change in magnitude of the analog input signal between conversion cycles.

While in its unstable state, the one-shot 20 prevents the switch S1 from closing until a steady-state voltage appears across the capacitor C which is directly proportional to the analog signal magnitude. During the time while the one-shot is in its unstable state the display 26A, 26B, by virtue of the now stabilized counting means 24, provides a persistent and readable display of the magnitude of the previously measured analog input signal.

Upon the time-delayed return of the one-shot 20 to its stable state, the gate 23 is enabled by a sharp change in the output voltage of the one-shot to transmit pulses from the clock 23 to the counting means 24. The counting means 24 now advances until an overflow signal is produced which is transmitted to the bistable 15 via the SET lead and thereby triggers the bistable 15 so that the latter switches from its RESET into its SET state.

When the bistable 15 switches into its SET state the resulting sharp voltage transition, which appears as an oppositely directed voltage at the bistable output is applied via the conductor 16 to the switch S1 causing the switch S1 to close and initiate the essentially constant discharge of the capacitor C coincidentally with a predetermined, and typically zero count, in the counting means 24. The constant discharging of the capacitor C, by way of a reference current $I_R$, generates the ramp portion 44 of the voltage $E_o$, FIG. 5B, at the amplifier output terminal 13. Since the bistable 15 is typically triggered into its SET state during a recycling transition of the counting means 24, the coincidental predetermined binary-coded decimal number is typically represented by a decimal number consisting of one or more 0 digits, depending upon the required resolution of the displayed number and correspondingly the number of decade counters employed by the counting means 24. The counting means 24 then counts the total number of clock pulses received from the clock 23 during the time interval required to discharge the capacitor C to 0 volts. The number of pulses counted until zero-crossing of the generated ramp reoccurs provides a digital representation of the analog signal then under measurement.

The aforedescribed apparatus operates continuously to convert an analog signal to a respective measurable time interval, $T_x$, or pulse width as determined by the pulse output of the bistable 15, and more particularly, to a representative digital output. The apparatus may also be selectively started by employing various techniques and means which will be apparent to those skilled in the art. For example, a voltage might be selectively applied to a suitable terminal in the one-shot 20 which would keep the one-shot in an unstable state until it is desired to start a conversion cycle whereupon the restraining voltage would be removed and the one-shot thereby released to return to the stable state and initiate the ramp-generating portion of a conversion cycle. It is also possible to control the operation of the instant apparatus by controlling the state of the gate 22 and hence the flow of clock pulses to the counting means. To illustrate, the gate 22 could be disabled by the selective application of a suitable disabling voltage thereto to stop the conversion cycle and then enabled by removing this voltage to reinitiate one or more conversion cycles. Other alternatives will be manifest to those skilled in the art.

What we claim is:

1. Apparatus for converting a slow time-varying input signal into a time interval which represents the magnitude of said input signal comprising, an operational amplifier having an input for receiving the input signal and an output, a nonregenerate feedback circuit coupling the amplifier output to the amplifier input, storage means in said feedback circuit, means for applying the input signal to said amplifier at least until said storage means stores a signal of magnitude proportional to the magnitude of the input signal, a source of reference signal having a polarity opposite that of said input signal and a magnitude sufficient to discharge said storage means at a constant rate to a predetermined level in a time interval which represents the magnitude of said input signal, a negative feedback resistance network coupling the amplifier output to the amplifier input and causing said amplifier to operate essentially as a DC amplifier while said storage means receives and stores said input signal, and means including a resistor for supplying the reference signal to said storage means, and for causing said amplifier to operate with said storage means as an integrator while said storage means discharges.

2. Apparatus as claimed in claim 1 which further comprises, means for timing said time interval during which said storage means discharges to provide a digital representation of the input signal magnitude.

3. Apparatus as claimed in claim 1 wherein said means for applying said reference signal to said storage means comprises, switch means coupled between the reference signal source and said amplifier input for applying said reference signal to said input when closed and for removing said reference signal from said input when opened, and means coupled to said switch means for initiating the closure of said switch means whereby said reference signal is applied to said input.

4. Apparatus as claimed in claim 3 wherein said means for initiating the closure of said switch means comprises, a device coupled to said switch means and characterized as having a stable and an unstable state and returning to said stable state a predetermined time after being in said unstable state, said device initiating closure of said switch means by returning to said stable state.

5. Apparatus as claimed in claim 4 wherein said switch means remains open for a time interval at least as long as said predetermined time, and means coupled to the amplifier output and responsive to said storage means discharging to said predetermined level for driving said device into said unstable state.

6. Apparatus as claimed in claim 3 wherein the timing means comprises, a source of clock pulses and pulse counting means for counting said clock pulses and further, wherein said switch means is coupled to said pulse counting means and closes said discharge circuit in response to a predetermined count in said counting means.

7. Apparatus as claimed in claim 6 which further comprises, means coupled to said counting means and to said device and responsive to the state of said device for terminating pulse counting by said counting means while said device is in said unstable state.

8. Apparatus as claimed in claim 7 which further comprises, means coupled to said counting means for displaying a number representative of the count in said counting means, said predetermined time of said device being selected so that while pulse counting by said counting means is terminated the number displayed by the displaying means persists long enough to be determined visually.

9. An analog-digital converter comprising, a DC amplifier characterized as having high gain and an input and an output, negative feedback means coupling the amplifier output to the amplifier input and including an integrating capacitor and first resistor means in parallel with said capacitor, means for charging said capacitor to a value proportional to the analog signal magnitude, a source of reference signal of greater magnitude than, and of opposite polarity to, said analog signal for discharging said capacitor to a predetermined level, second resistor means coupled to said amplifier input, means for applying the reference signal through said second resistor means to said amplifier input when said capacitor attains said value, whereby said capacitor discharges from said value upon the application of said reference signal to said resistor means, and means for timing the discharging of said capacitor to said level to provide a digital representation of the analog signal magnitude, the time required to discharge said capacitor to said level being a function of the first and second resistor means.

10. The converter as claimed in claim 9 wherein said second resistor means comprises a resistor coupled to the amplifier input end of said first resistor means.

11. The converter as claimed in claim 9 wherein said second resistor means is in series with said first resistor and said reference signal is applied to a junction common to both resistors.

12. The converter as claimed in claim 9 wherein said second resistor means comprises, a resistance network formed of at least three interconnected resistors and further wherein a second capacitor is coupled to a junction common to two of said resistors and to a second source of reference potential.

13. Analog-digital converter comprising, an operational amplifier having an input and output, negative feedback circuit means coupling the amplifier output to the amplifier input, said feedback means comprising an integrating capacitor and at least two resistors, a first resistor in parallel with said capacitor and a second resistor having two ends, one end of said second resistor being coupled to said amplifier input, a source of reference signal of greater magnitude than the analog input signal and of opposite polarity with respect thereto, switch means having respective open and closed states coupled between the reference source and the other end of said second resistor, said amplifier operating essentially as a DC amplifier to an analog signal applied to the input thereof and said capacitor storing the resulting amplifier output potential when said switch means is open, said capacitor being discharged at a substantially constant rate to a predetermined level by said reference signal when said switch means is closed, means for closing said switch means, and digital means for timing the interval during which said capacitor is discharged to said predetermined level to provide a digital representation of the analog signal magnitude, said time interval being proportional to the product of the resistance value of said second resistor and the capacitance value of said capacitor.

14. The converter as claimed in claim 13 which further comprises, level detection means responsive to said capacitor discharging to said predetermined level for opening said switch means.

15. The converter as claimed in claim 14 which further comprises means coupled to said level detection means and to said switch means for holding said switch means open after said capacitor discharges to said predetermined level and at least until said capacitor stores a potential proportional to said analog input signal magnitude.

16. The converter as claimed in claim 13 wherein said means for closing said switch means comprises, a monostable device having respective stable and unstable states and switching to said unstable state in response to said capacitor discharging to said predetermined level, said device maintaining said switch means open at least while said device remains in said unstable state, the time interval during which said device remains in said unstable state being sufficient to permit said capacitor to store a voltage proportional to the magnitude of the analog signal received at said amplifier input.

17. The converter as claimed in claim 16 wherein the digital means comprises, a source of clock pulses and pulse counting means for counting the clock pulses, and means coupled to said device, to said pulse counting means and said clock pulse source, and responsive to the state of said device, for blocking the flow of clock pulses to said counting means while said device is in said unstable state, whereby said counting means stabilizes at a count equivalent to the magnitude of the analog signal.

18. The converter as claimed in claim 13 wherein the analog signal is received by said amplifier input from an analog signal source and which further comprises, second switch means coupled between said analog signal source and said amplifier input for decoupling said analog signal source from said amplifier input while said capacitor is discharging.

19. An apparatus for converting an analog input signal into representative digital form and including a high-gain DC amplifier having an integrating capacitor coupling the amplifier output to the amplifier input, the amplifier input receiving said analog input signal, comprising, a first resistor connected in parallel with said capacitor, a source of reference signal having a magnitude greater than the magnitude of said input signal and of opposite polarity with respect thereto, a second resistor having one end connected to the amplifier input end of said first resistor, the other end of second resistor being connected to a terminal, and switch means for selectively applying the reference signal to said terminal, whereby said amplifier acts as a relatively sensitive and stable DC amplifier that charges said capacitor when said switch means is open and when said switch means is closed acts in conjunction with said capacitor to perform a time integration on the current received from said source.

20. The converter as claimed in claim 19 wherein the amplifier input end of said first resistor and said one end of said second resistor form a common current-summing junction with a terminal at said amplifier input.

21. The converter as claimed in claim 20 which further comprises a second capacitor having one side connected to a source of constant potential, and resistance means in parallel with said second resistor and coupled to the other side of said second capacitor, the values of said second capacitor and said resistance means being such as to compensate for nonlinearities in said time integration.